United States Patent [19]

Pääkkönen et al. [45]

[11] Patent Number: 4,929,019

Date of Patent: May 29, 1990

[54] DEVICE FOR OPENING AND CLOSING THE ROOF HATCH OF A VEHICLE

[75] Inventors: Taisto Pääkkönen, Raisio; Vainio Veijo; Turpeinen Jarkko, both of Parainen, all of Finland

[73] Assignee: Oy Parton Ab, Parainen, Finland

[21] Appl. No.: 297,905

[22] Filed: Jan. 17, 1989

[30] Foreign Application Priority Data

Jan. 19, 1988 [FI] Finland .................................. 880218

[51] Int. Cl.$^5$ .............................................. B60J 7/057
[52] U.S. Cl. ..................................... 296/223; 296/216; 49/193; 49/324; 74/89.15
[58] Field of Search ....................... 296/216, 222, 223; 49/193, 324, 340; 74/89.15, 105, 106

[56] References Cited

U.S. PATENT DOCUMENTS

| 2,408,132 | 9/1946 | Weeks | 296/223 |
| 2,517,303 | 8/1950 | Green | 98/2.14 |
| 4,364,601 | 12/1982 | Katayama et al. | 296/222 X |
| 4,601,512 | 7/1986 | Boots | 296/223 X |
| 4,626,027 | 12/1986 | Farmont | 296/223 |

FOREIGN PATENT DOCUMENTS

| 533581 | 12/1954 | Belgium | 296/216 |
| 2919 | 7/1979 | European Pat. Off. | 296/216 |
| 1142512 | 1/1963 | Fed. Rep. of Germany | 296/216 |
| 1555432 | 4/1970 | Fed. Rep. of Germany | |
| 2578494 | 6/1987 | France | |
| 1350844 | 4/1974 | United Kingdom | |
| 1577316 | 10/1980 | United Kingdom | 296/216 |

Primary Examiner—Margaret A. Focarino
Assistant Examiner—Andrew C. Pike
Attorney, Agent, or Firm—Biebel, French & Nauman

[57] ABSTRACT

The invention relates to an opening and closing device for a vehicle roof hatch (1). The device according to the invention comprises a stationary bar (4) and a toggle lever system connected to both ends of the bar. One end of the long lever arm (5) of the lever system is connected movably to the bar (4) and its other end of the roof hatch (1). One end of the shorter lever arm (6), which is half the length of the longer lever, is connected stationarily to the bar and its other end to the middle (7) of the long lever arm. The bar is threaded so that one half is threaded in one direction and the other half in the opposite direction. The bar is driven by an electric motor, whereupon the toggle lever system "opens" or "closes", depending on the direction of rotation, and raises or respectively lowers the roof hatch side in question, maintaining the side horizontal at all times.

7 Claims, 2 Drawing Sheets

DEVICE FOR OPENING AND CLOSING THE ROOF HATCH OF A VEHICLE

BACKGROUND OF THE INVENTION

The present invention relates to an opening and closing device according to the preamble of claim 1 for a roof hatch.

Roof hatches are primarily used in buses for ventilation and as emergency exits. The devices for opening and closing them must be easy to use, require as little space as possible, and, of course, be easy to install.

The known devices for opening and closing roof hatches are manually operated mechanical devices or remote-controlled pneumatic devices. Mechanical devices take a great deal of space and increase the total height of the vehicle. The tubes of pneumatic devices are inconvenient to install and therefore considerably increase the installation costs.

GB patent 1 350 844, for example, discloses a mechanical device in which the opening and closing movement of the roof hatch is effected by means of a lever system connected to a bar and by means of a vertical member articulated to the lever system and the hatch. The said vertical member increases the height of the construction in the closed position, and additionally it requires considerable special attachments to enable the vertical member and the roof hatch to move in relation to each other during the lifting and lowering movement of the roof hatch. Each corner of the roof hatch can be moved independently of the other corners, but only to the open position or the closed position, and not to any intermediate position.

SUMMARY OF THE INVENTION

The object of the present invention is to provide a roof hatch opening and closing device which is of a maximally simple construction, takes as little space as possible, does not increase the height of the roof hatch construction, and can be opened steplessly in the horizontal direction or tilted forwards or backwards in the drive direction.

This is achieved with the opening and closing device according to the invention by giving it the characteristics according to claim 1.

The bar of the opening and closing device according to the preamble of claim 1 is thus, according to the invention, provided with a thread so that in one half of it, in the longitudinal direction, the thread is, for example, an S-shaped thread, and in the other half the thread is in the opposite direction. When the bar is rotated, the moving ends of the longer arms of both lever systems thus move in opposite directions over a distance which depends on the number of revolutions rotated by the bar. While the end secured movably to the bar moves along the bar, the opposite end, which is articulated to the roof hatch, is raised or lowered, thereby raising or lowering the roof hatch. Since each of the lever systems is made up of three arms of equal length, that end of the longer arm which is secured to the roof hatch moves in the vertical direction when the bar is rotated. Since, furthermore, the lever systems connected to the same bar are identical, but are installed as mirror images of each other, and the thread of the bar in each half longitudinally is identical, the corresponding side of the roof hatch remains horizontal throughout movement in the vertical direction.

To the roof edge surrounding the aperture in the roof there is preferably fixedly fitted two bars, one to the front side, in relation to the drive direction, and the other to the rear side. Both bars with their lever systems can be used independently of each other, and the corresponding sides of the roof hatch move respectively independently of each other. The roof hatch may have only one bar with its lever system, in which case only the side guided by it will be raised and lowered.

The rotating of the bars is preferably by an electric motor, which enables the bus driver, a passenger or anyone to adjust, open or close the roof hatch by pressing a button either in the dashboard of the bus or close to the hatch. The rotating of the bars may, of course, also be effected in some other manner, for example by manual cranking.

Since the opening and closing device is of plastic or some corresponding resilient material, it yields, if necessary, if one side is raised higher than the other.

The advantages of the opening and closing device according to the invention are obvious. Its construction is very simple, consisting of simple structural parts known per se. The device itself and the necessary electric wiring are easy to install. The device takes very little space and fits, for example, in a groove, covered by the hatch, between the roof aperture and the hatch. It can be adjusted steplessly. An emergency trigger is easy to install in it, on both the inside and the outside, or on only one side. The device may, for example, be fastened to the frame of the roof hatch by a dovetail joint secured by a cotter. In a case of emergency the cotter is removed, whereupon the joint can be undone by pushing the construction loose from the frame.

BRIEF DESCRIPTION OF THE DRAWING

The invention is described below in greater detail in the form of a preferred embodiment of the invention, with reference to the accompanying figures, in which.

DESCRIPTION OF THE PREFERRED EMBODIMENT

Figure 1:
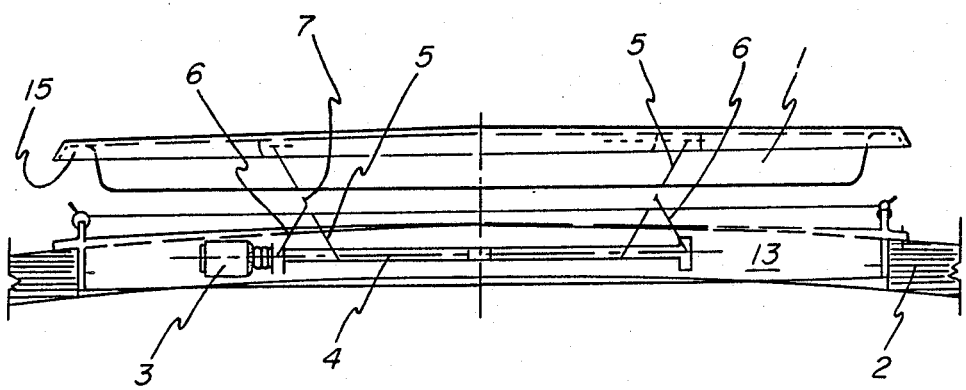
FIG. 1 depicts a roof hatch with its opening and closing device, installed in the roof of a vehicle, as seen from the front and in the open position.

In the figures, the same parts are indicated with the same reference numerals. The roof hatch is indicated by numeral 1, the roof of the bus by 2, the electric motor of the opening and closing device by 3, the threaded bar by 4, the long arm of the toggle lever system by 5, and the short arm by 6. That end of the longer arm 5 which moves along the bar 4 is indicated by 5a and the end fastened to the roof hatch by 5b. That end of the shorter arm 6 which is fastened to the bar is indicated by 6b. Numeral 7 indicates the central pivot point of the lever system.

Figure 2:
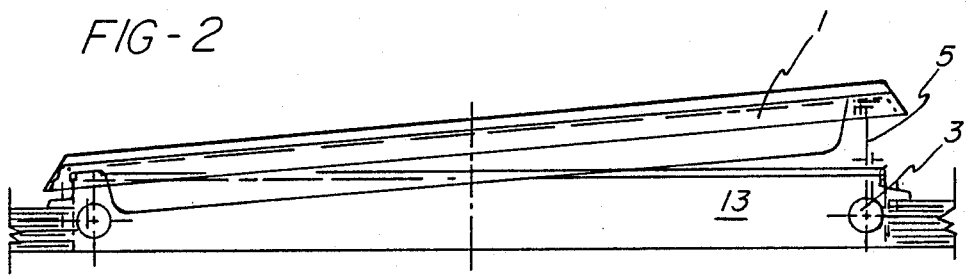
FIG. 2 depicts the same as FIG. 1, but as seen from the side and with only the front side of the hatch opened.
Figure 3:
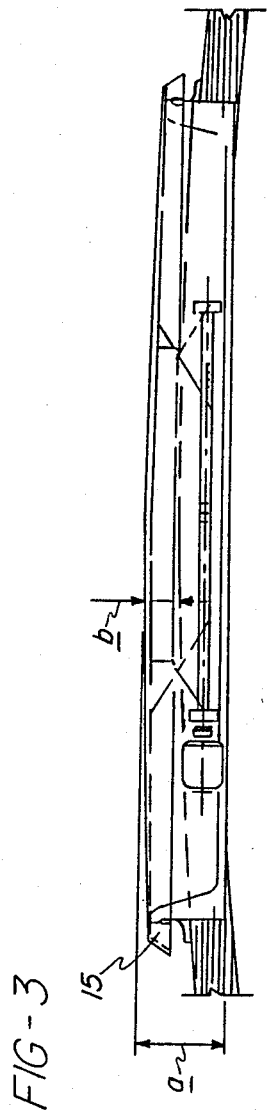
FIG. 3 depicts the same as FIG. 1, but with the hatch in the closed position.
Figure 4:
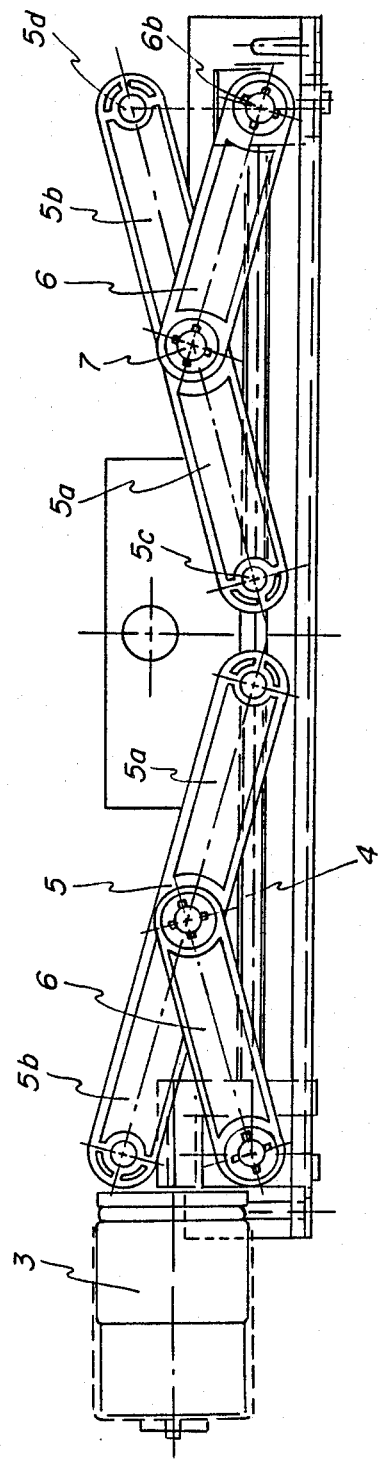
FIG. 4 depicts the opening and closing device in detail and with the roof hatch removed.

FIGS. 1-3 depict an opening and closing device according to the invention, fitted to a vehicle roof aperture and roof hatch, in different positions of the roof hatch. In FIG. 1 the hatch is in the open position, in FIG. 2 with only the front side raised, and in FIG. 3 the hatch is closed. One end of the shorter arm 6 of the toggle lever system is connected to pivot point 7 of the lever system between the ends of arm 5, and its other end is fastened stationarily, but pivotably, to pivot point 6b. The length of the shorter arm 6, which is articulated at pivot point 7 to the middle of the longer arm 5, is one-half of the length of the longer arm 5. The lower end of the longer arm 5 of the toggle lever system is connected movably to the bar at pivot point 5c and its upper end is connected pivotably to the roof hatch at point 5d. The distances of all the three pivot points 5c, 5d and 6b from the central pivot point 7 are equal. Owing to this, the line between pivot point 5d and pivot point 6b is always vertical. The threaded bar 4 comprises two halves being of a continuous structure which rotate uniformly. Since the thread of the threaded bar 4 is similar on both halves of the bar 4, the pitch being the same, but in opposite direction in relation to each other, the movements of the two lever systems are symmetrical and the moving front side and/or rear side of the hatch is horizontal.

The roof hatch is very easy to operate using the opening and closing device according to the invention. Both the front side and the rear side of the hatch have each an electric-motor control button, and the respective side can be raised or lowered by pressing the button. It is possible to raise only one side or both of them, independently of each other. The roof hatch may also have only one bar with its lever system, in which case the hatch can be opened only to a tilted position.

The opening and closing device according to the invention can, of course, vary in many ways within its protective scope. Instead of an electric motor, for example, it may be rotated manually.

We claim:

1. An opening and closing device for a vehicle roof hatch (1), comprising a bar (4) fixedly fitted to an edge surrounding a vehicle roof aperture and two lever systems (5, 6, 7) which are identical but installed as mirror images of each other, each lever system consisting of a long arm (5) one end (5c) of which is movably fastened to the bar and another, upper end (5d) thereof fastened to the roof hatch, and of a short arm (6) one end (6b) of which is fastened pivotably to the bar and another end is pivotably fastened between the ends of the long arm (5), in which case a corresponding area of the roof hatch can be caused to move in a vertical direction by moving the movable end of the long arm; wherein the bar (4) is threaded so that two halves thereof are threaded longitudinally in opposite directions, a length of the short arm (6) is one-half of a length of the long arm (5) and the short arm (6) is articulated (7) to a middle of the long arm.

2. An opening and closing device according to claim 1, wherein the two halves of the bar (4) are of continuous structure and rotate uniformly when the bar is rotated, a corresponding side of the roof hatch remaining horizontal when moving in the vertical direction.

3. An opening and closing device according to claim 2 further comprising another bar (4) with another two lever systems (5, 6, 7) thereof, wherein one of the bars with the two lever systems thereof is at the a front side of the roof aperture, relative to a drive direction, and the other of the bars with the two lever systems thereof is at a rear side of the roof aperture.

4. An opening and closing device according to claim 2, furthers comprising an electric motor (3) fitted to drive said bar.

5. An opening and closing device according to claim 1, further comprising another bar (4) with another two lever systems (5, 6, 7) thereof, wherein one of the bars with the two lever systems thereof is at a front side of the roof aperture, relative to a drive direction, and the other of the bars with the two lever systems thereof is at a rear side of the roof aperture.

6. An opening and closing device according to claim 5, further comprising an electric motor (3) fitted to drive each bar.

7. An opening and closing device according to claim 1, further comprising an electric motor (3) fitted to drive said bar.

* * * * *

UNITED STATES PATENT AND TRADEMARK OFFICE
CERTIFICATE OF CORRECTION

PATENT NO. : 4,929,019
DATED : May 29, 1990
INVENTOR(S) : Taisto Pääkkönen et al.

It is certified that error appears in the above-identified patent and that said Letters Patent is hereby corrected as shown below:

ON THE TITLE PAGE:

ITEM [75]

The name of the second inventor should be changed to read --Veijo Vaino--

The name of the third inventor should be changed to read --Jarkko Turpeinen--

The following should be added as inventors:

Rauno Jyrkiäinen of Turku, Finland
    Seppo Kilpinen of Parainen, Finland

Signed and Sealed this

Tenth Day of September, 1991

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,929,019

DATED : May 29, 1990

INVENTOR(S) : Taisto Paakkonen et al.

It is certified that error appears in the above-identified patent and that said Letters Patent is hereby corrected as shown below:

On the title page item [75] Inventors:
The name of the second inventor should be changed to read
--Veijo Vainio--

The name of the third inventor should be changed to read
--Jarkko Turpeinen--

The following should be added as inventors:

Rauno Jyrkiainen of Turku, Finland

Seppo Kilpinen of Parainen, Finland

This certificate supersedes Certificate of Correction issued September 10, 1991.

Signed and Sealed this

Third Day of March, 1992

*Attest:*

HARRY F. MANBECK, JR.

*Attesting Officer*  *Commissioner of Patents and Trademarks*